Sept. 28, 1971                 R. A. HARDIN                 3,608,384

APPARATUS FOR ROTATIONALLY POSITIONING A SUPPORTED LOAD

Filed Jan. 3, 1969                                        2 Sheets-Sheet 1

INVENTOR.
ROBERT A. HARDIN

BY Davis, Hoxie, Faithfull & Hapgood
ATTORNEYS

Sept. 28, 1971  R. A. HARDIN  3,608,384
APPARATUS FOR ROTATIONALLY POSITIONING A SUPPORTED LOAD
Filed Jan. 3, 1969  2 Sheets-Sheet 2

INVENTOR.
ROBERT A. HARDIN
BY
Davis, Hoxie, Faithfull & Hapgood
ATTORNEYS

3,608,384
APPARATUS FOR ROTATIONALLY POSITIONING A SUPPORTED LOAD
Robert Allen Hardin, Murray Hill, N.J., assignor to Skagit Corporation, Sedro-Woolley, Wash.
Filed Jan. 3, 1969, Ser. No. 788,885
Int. Cl. G01c 19/00
U.S. Cl. 74—5.22                                   3 Claims

ABSTRACT OF THE DISCLOSURE

Apparatus for selectively horizontally orienting a freely swiveled cargo load, and for maintaining a desired horizontal position, employs a rotating flywheel attached to a load bearing platform by a mounting gimbal. Apparatus is provided to selectively rotate the spinning flywheel about a horizontal axis disposed along a diameter of the flywheel, thereby applying a torque in a desired direction about the vertical axis of the gimbal, platform and load. Thus, the load may be rotated in a horizontal plane to any desired orientation and, moreover, maintained in that position.

---

This invention relates to cargo processing and, more specifically, to an arrangement for controlling the horizontal orientation of a translating load.

In many applications of present-day interest, a load is moved by a crane, hoist or other mechanism from a first position, e.g., a loading dock to a second position, e.g., a ship's hold. The load may be mounted on, or supported by a platform which, in turn, is attached by a cable or the like to the crane or other supporting apparatus.

The heavy platform and load are in most instances secured to the lifting mechanism in a manner such that the load and platform are free to rotate in a horizontal plane, the cable offering essentially no restriction or torsional resistance to such rotation. External torques for imparting rotation to the swiveled platform and load are associated with most cargo transporting environments. Such sources of torque comprise, for example, wind acting against the vertical profile of the platform and load; inertial reaction forces developed responsive to the crane boom slewing the load from its initial rest position to its final destination; or movement of the crane itself as by rolling of a ship for a ship mounted crane. Many other sources of spurious rotational motion inducing torque similarly exist.

It is often necessary to position the load in a precise horizontal orientation at the cargo receiving station and/or to inhibit rotation of the load at that station. For example, relatively large loads of a fixed, noncircular shape must be oriented to fit and pass through a hatchway in the ship's deck before entering the cargo hold. Since rotation of the load is all but inevitable for prior art arrangements having the load freely swiveled for rotation by a supporting cable, manual labor has been required to properly orient the load when necessary. For example, longshoremen have been typically required to adapt a load to pass into a ship's hold through hatchways which are not appreciably larger than the horizontal profile of the load.

Prior art cargo handling arrangements have therefore been unsatisfactory in several respects. The use of manual labor to orient the load is inherently expensive, and also dangerous when unfavorable conditions prevail. Also, where severe rotation exists, prior art techniques have often proven totally ineffective to suppress rotation of loads which may weigh many tons without damaging cargo and equipment, or harming personnel.

It is therefore an object of the present invention to provide an improved cargo processing organization.

More specifically, an object of the present invention is the provision of a cargo supporting structure for inhibiting undesired rotation of a cargo load, and for effecting and maintaining any desired horizontal orientation of the load.

These and other objects of the present invention are realized in a specific, illustrative cargo transporting assembly which includes a platform having a load secured thereto. A gimbal is rotatably attached to the platform, and selectively secured thereto by a clutch. A rotating flywheel mass is affixed within the gimbal, and a motor is provided to selectively tilt the flywheel in either direction about a horizontal axis disposed along a diameter of the flywheel. A cable or the like connects the platform and load to a supporting, lifting and translating mechanism.

To horizontally rotate and orient the load, an operator energizes the motor while the clutch is engaged. The motor tilts the flywheel in a desired direction, thereby developing a torque about the vertical axis of the gimbal, platform and load. Thus, the load is rotated to the desired position responsive to the applied torque. Rotation is terminated by resetting the flywheel mass while the clutch is engaged. Alternatively, repetitive rotation-actuating moment impulses can be applied to the load by tilting the flywheel mass in one direction while the clutch is engaged, and resetting the flywheel in the opposite direction while the clutch is disengaged.

A complete understanding of the present invention, and of the above and other objects, features and advantages thereof, may be gained from a consideration of two illustrative embodiments thereof in conjunction with the accompanying drawing in which:

FIG. 1 comprises an isometric view of a cargo conveying and rotation controlling assembly embodying the principles of the present invention;

FIG. 2 comprises a schematic diagram of electrical circuitry associated with the arrangement of FIG. 1;

Figure 1:
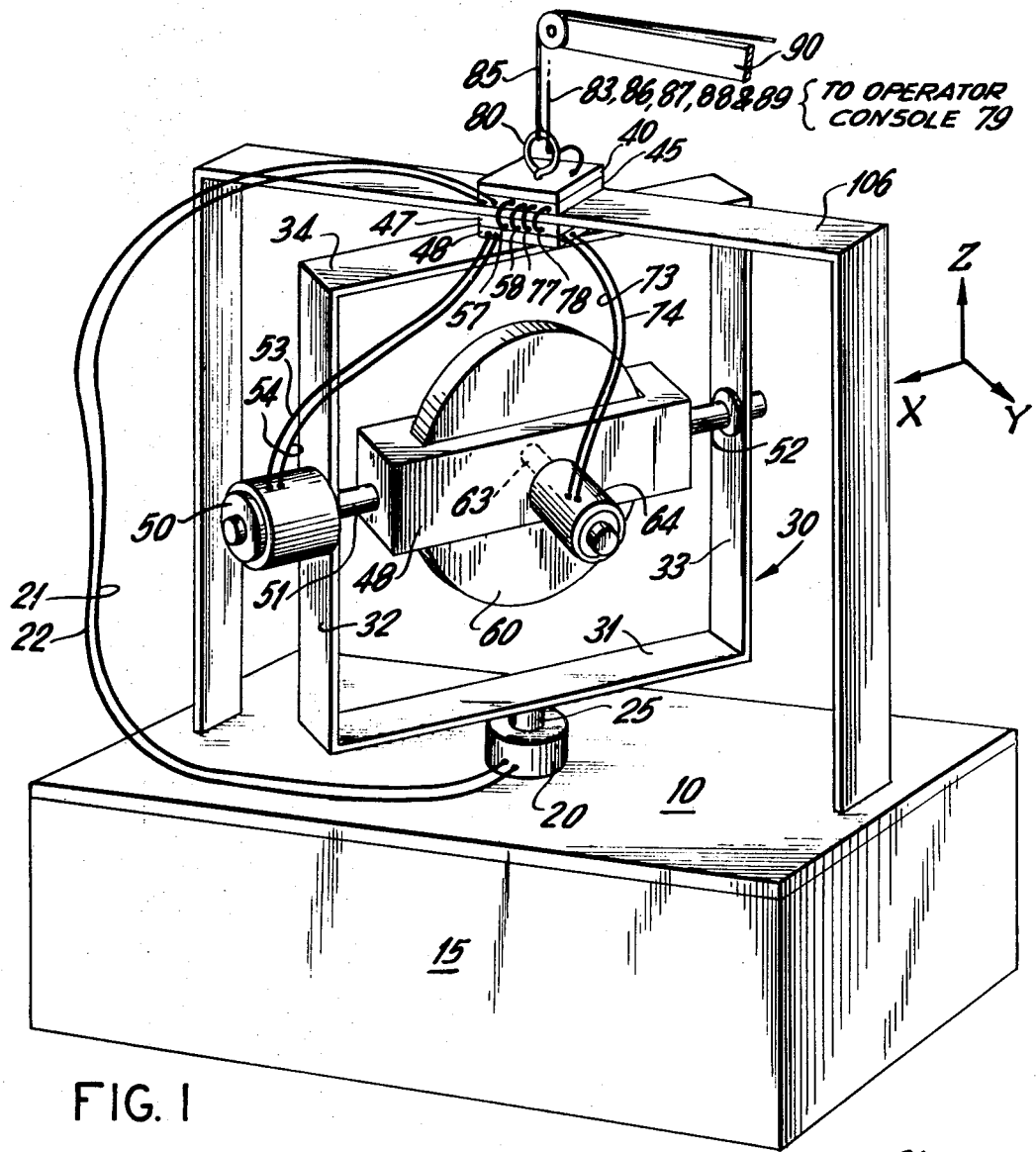

Referring now to FIG. 1, there is shown a load supporting platform 10 having a load 15 affixed thereto in any known manner (not shown), e.g., by clamping, netting, fasteners or the like. Alternatively, the load 15 may be disposed on top of the platform 10. A gimbal 30, comprising four frame members 31, 32, 33, and 34 also includes a shaft portion 25 rotatably attached to the platform 10, as through any bearing structure.

A clutch 20 is provided to secure the shaft 25 to the platform 10. The clutch 20 is adapted to quiescently inhibit any relative movement between the shaft 25 and the platform 10, and to disengage these elements when electrical energy is supplied to two leads 21 and 22. Various clutch assemblies are well known to those skilled in the art and the clutch 20 may comprise, for example, a structure normally spring biased into an engaged state and having a release mechanism (for example, pneumatically operated) which may be actuated under control of an electrical solenoid-regulated valve selectively operated by energy impressed on the wires 21 and 22.

A flywheel mass 60 is secured to a shaft 63 which is rotationally affixed to a mounting bracket 48. The bracket 48, in turn, is supported for rotation about a horizontal axis by two shafts 51 and 52 which are fixed to the bracket 48, and are rotationally mounted on the gimbal 30 members 32 and 33, as by antifriction or spherical bearings.

A motor 50 is mounted on the gimbal member 32 and coupled to the shaft 51 for tilting the mounting bracket 48, and thereby also the flywheel 60, when two motor leads 53 and 54 are energized. The direction of rotation of the motor armature, bracket 48 and flywheel 60 depends upon the relative polarity of the voltage impressed between the leads 53 and 54. A motor 64 is mounted on the bracket 48 and coupled to the shaft 63 for rapidly rotating the flywheel 60. The motors 50 and 64 may be directly coupled to the shafts 51 and 63, or secured thereto through any suitable belt, chain, gear coupling, or other linkage.

The platform and load assembly is attached to a crane boom 90 or the like by a cable 85. More specifically, a mechanical support member 106 is attached to the platform 10, and the cable 85 is secured to the support member 106 via a ring 80 which is affixed thereto, as by a bolt and nut, or the like. Disposed about the bolt (not shown) or other fastener attaching the ring 80 and the support member 106 are two connection blocks 40 and 45 having a plurality of mating electrical slip rings $a$ therebetween, with the block 45 being secured to the support structure 106. The slip rings are well known in the art and may comprise, for example, plural concentric conductive rings on one block 40 or 45, and radially disposed wiper contacts on the other block. Similarly, two blocks 47 and 48 are disposed between and respectively affixed for rotation to the support member 106 and the gimbal frame member 34, with a plurality of mating slip rings $b$ being disposed between blocks 47 and 48. The electrical connections for the slip rings $a$ and $b$ are shown in FIG. 2, and discussed below.

Figure 2:
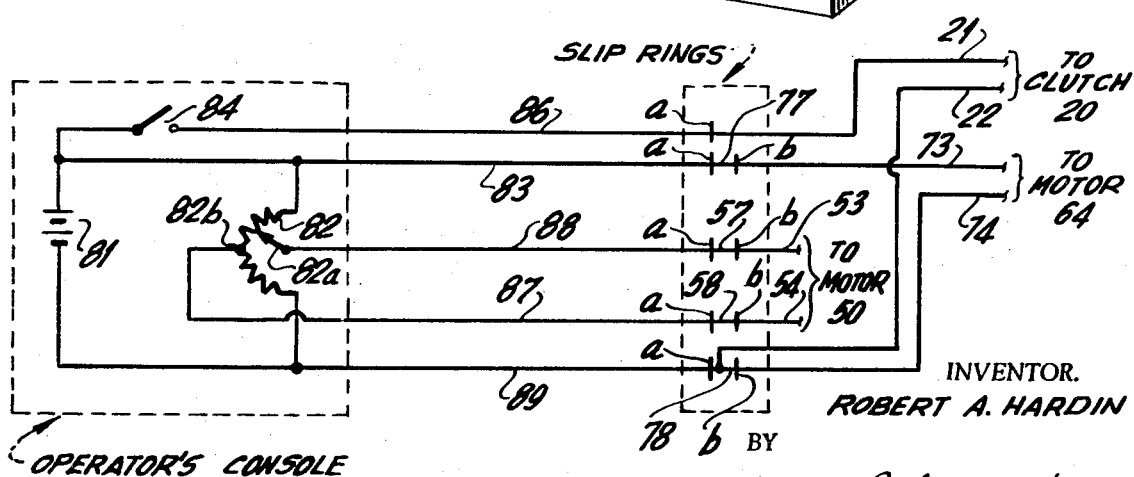

Five control wires 83, 86, 87, 88 and 89, electrically connected as shown in FIG. 2, pass between an operator console 79 physically located at an operator station and the platform assembly, the wires illustratively passing alongside the cable 85. The lead 83 and the common lead 89 connect the full voltage of direct current source 81 to the flywheel spinning motor 64 via the slip rings $a$ between the blocks 40 and 45, the leads 77 and 78, the slip rings $b$ between the blocks 47 and 48; and the leads 73 and 74.

The flywheel tilting motor 50 is energized with a potential of variable amplitude and variable polarity by adjusting a movable tap 82a relative to a fixed center tap 82b on a potentiometer 82. The voltage difference between the elements 82a and 82b is communicated to the motor 50 by way of leads 88 and 87, the slip rings $a$ between the blocks 40 and 45, two leads 57 and 58, the slip rings $b$ between blocks 47 and 48, and the leads 53 and 54. A switch 84, leads 86 and 89, the slip rings $a$, and leads 21 and 22 are employed to selectively actuate the clutch disengaging solenoid-regulated valve when the switch 84 is closed by an operator.

Figure 3:
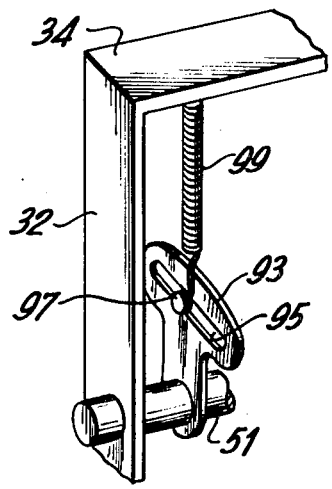
FIG. 3 depicts a rotation limiting structure for the arrangement of FIG. 1.

Finally, in accordance with one aspect of the present invention, as shown in FIG. 3, the tilting movement of the flywheel 60 is limited to some desired range, e.g., 45 degrees in either direction from vertical. To this end, a limiting form 93 having a transverse slot 95 therein is secured to at least one and preferably to both of the shafts 51 and 52. Only the structure attached to the shaft 51 is shown in FIG. 3 for conciseness. A pin 97 with an expanded portion at both ends thereof freely slides in the slot 95. A relatively stiff tension spring 99 is attached to the gimbal frame and to the pin 97. As the shaft 51 rotates in either direction up to 45 degrees from vertical, the pin 97 slides freely through the slot 95. Beyond the 45 degrees displacement, the pin 97 resides at one end of the slot 95 and the spring 99 largely retards any further significant rotation of the flywheel 60.

With the above structure in mind, an illustrative sequence of operation for the FIG. 1 cargo controlling apparatus will now be described. The load 15 is secured to the platform by the appropriate mechanism, and the flywheel 60 spins at its normal rate of speed under action of the motor 64 driven by the source 81 through the wires 83 and 89, the slip rings $a$, the wires 77 and 78, the slip rings $b$, and the wires 73 and 74. Also, the switch 84 is in an open state such that the clutch solenoid is unenergized, hence engaging the clutch and preventing relative rotation between the platform 10 and the gimbal shaft 25. For convenience, a set of three coordinate orthogonal axes X, Y and Z has been established for reference in FIG. 1, with the spin axis for the flywheel (normal thereto) comprising the Y axis. The X and Z axes are both disposed along the central interior diameter of the flywheel 60 (hereinafter, this is deemed the plane of the flywheel 60), with the X and Z axes being horizontally and vertically disposed, respectively. The coordinate axis system will be most useful if fixed to the flywheel 60 and permitted to rotate with this element.

After the load 15 has been secured to the platform 10, with the flywheel 60 at design speed, and with the clutch 20 engaged, the cargo operator lifts the load by retracting the cable 85 and moves the load towards its intended destination. If the load is to be rotated to a new orientation in its horizontal plane, the operator moves the tap 82a of the potentiometer 82 in the appropriate direction away from the center of the potentiometer 82. Depending upon the direction of displacement of the tap 82a, the motor 50 will rotate the shaft 51 in one direction or the other about the horizontal X axis, with the motor 50 energizing potential being supplied thereto by way of the leads 87 and 88, slip rings $a$, the leads 57 and 58, slip rings $b$, and the leads 52, 53 and 54.

When the motor 50 turns the shaft 51, the mounting bracket 48 and the flywheel 60 are similarly tilted about the horizontal X axis. It is a physical principle that an angular rotation $w$ about an input axis will generate an output torque about an output axis disposed 90 degrees from the input axis and disposed 90 degrees from the spin axis. This torque may be expressed quantitatively with reference to the coordinate system of FIG. 1 as a vector cross product;

$$\vec{T_z} = (\vec{I_y w_y}) \times \vec{w_x}$$

where $T_z$ is the output torque developed about the vertical Z axis of the flywheel 60; $I_y$ is the moment of inertia of the flywheel 60 about its spin (Y) axis; $w_y$ is the rate of spin of the flywheel about its spin axis; and $w_x$ is the speed of rotation of the flywheel about the X axis. Thus, with particular reference to the principles of the instant application, rotation of the flywheel 60 about its horizontal X axis caused by the motor 50 develops a torque about the vertical or Z axis of the flywheel 60 which is displaced 90 degrees from both the input (X) axis and the spin (Y) axis. This moment is communicated by the shafts 51 and 52 to the gimbal side frames 32 and 33, and by these members to the gimbal shaft 25. Since the shaft is secured to the platform 10 and the load 15 by the clutch 20, the developed torque is similarly applied thereto. Responsive to the applied torque, the load 15 rotates in the desired direction dictated by the direction of rotation of the motor 50 which, in turn, depends upon the direction the operator displaced the potentiometer tap 82a.

Assuming that one application of driving torque to the load 15 is sufficient in relation to the moment of inertia of the load about its vertical axis to rotate the load against any wind or other external moments to its desired final orientation within a reasonable time, e.g., the time it takes for the crane boom 90 to slew the load to its final destination, the operator will reverse the direction of rotation of the motor 50 when the cargo 15 approaches its desired orientation. This returns the flywheel 60 to its initial position with respect to the X axis, this being accomplished by changing the setting of the potentiometer 82a. As the flywheel 60 tilts toward its initial position (a direction opposite to that first undertaken) a torque is developed orthogonal to the X and Y axes in accordance with the above physical law, i.e., about the Z or vertical axis. This driving moment is coupled to the gimbal 30, the platform 10 engaged therewith, and the load 15. Since the direction of motion of the flywheel 60 is opposite to the case first considered, this driving torque is of an opposite sense vis-a-vis the torque which initially rotated the load, and suffices to break and stop the load at the desired orientation which has thus been established.

Alternatively, one application of a torque impulse may not be sufficient to impart sufficient rotation to a massive load. For this case, the operator closes the switch 84 after the flywheel has once been rotated, thereby energizing the clutch solenoid through the leads 86 and 89, slip rings a, and leads 21 and 22. This causes the clutch 20 to decouple the gimbal shaft 25 and the platform 10 permitting rotation of the gimbal 30 relative to the platform 10. The operator then adjusts the potentiometer tap 82a to turn the motor and reset the flywheel 60 about the X axis to its initial state. By physical law this again produced an output torque about the vertical Z axis of the flywheel 60. However, because the clutch 20 is not engaged, this torque will not be applied to the load or platform, but will simply cause the gimbal 30 and the flywheel 60 to rotate and be displaced in a direction counter to the load.

After the flywheel 60 is reset to its initial state, switch 84 is reopened by the operator and the clutch 20 thus resecures the gimbal shaft 25 and the platform 10. He then moves the potentiometer tap 82a in the initial direction to again cause the motor 50 to tilt the flywheel 60 in the desired direction thus imparting a second torque impulse to the platform and load.

The above process can be repeated any number of times until the load is rotating in an acceptable manner. Similarly for this repetitive situation, the load is braked and stopped as it approaches the desired orientation by repetitively resetting the flywheel 60 while the clutch 20 is engaged and rotating the flywheel 60 in an opposite direction about the X axis while the clutch frees the members 10 and 25, i.e., when the switch 84 is closed. Also, torque pulse or pulses of either sense may be applied to the load when it is desired to counteract, in part or in whole, externally applied spurious moments.

After the load has been oriented in the proper position or, if the load is initially properly disposed, the motor 50 is unenergized. Should any external moments tend to horizontally rotate the load 15 and the platform 10 about the vertical Z axis from their proper orientation, a torque is developed about a 90 degree displaced axis, viz, the horizontal X axis of the flywheel 60 which is engaged with the platform and load via the gimbal 30 and the clutch 20. Accordingly, the flywheel 60 rotates about its X axis and, in response thereto, a large reaction moment is provided about the vertical Z axis in a direction which opposes the applied external torque. The composite assembly thus exhibits a large stiffness or rigidity about its vertical Z axis which acts to inhibit horizontal rotation of the load 15 otherwise occurring when spurious torques are applied thereto. Accordingly, the load 15 is maintained in its desired horizontal position until it reaches the cargo receiving station.

Thus, the arrangement of FIG. 1 has been shown by the above to orient a load in any horizontal position and, moreover, to maintain the desired orientation.

Figure 4:
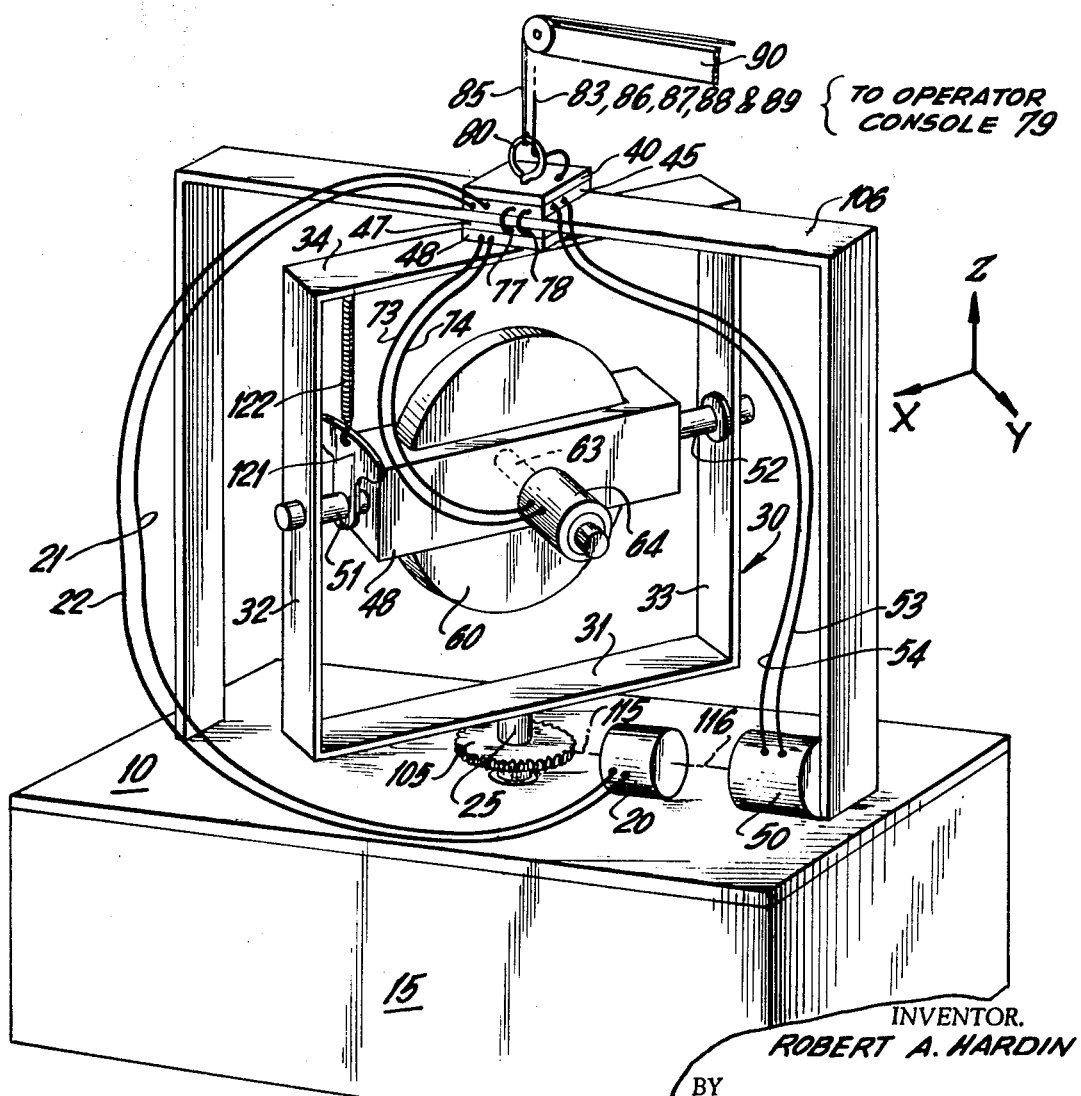
FIG. 4 illustrates a second specific cargo conveying arrangement in accordance with the principles of the present invention.

A second cargo controlling arrangement embodying aspects of the present invention is shown in FIG. 4. The arrangement of FIG. 4 is structurally and functionally similar to the embodiment of FIG. 1, except that the motor 50 is located on the platform 10 and coupled to a pulley, sprocket or other driving element 105 secured to the gimbal shaft 25 by the clutch 20 (which has thus been moved from the shaft 25) and any suitable linkages 115 and 116. The linkages may comprise, for example, chains, belts, gear trains and, for the element 116, a shaft from the motor 50. Further, a form 121 is affixed to the shaft 51 (and preferably also the shaft 52) and connected by a tension spring 122 to the gimbal frame 34. Unlike the structure 93 of FIG. 3 which included a transverse slot 95, the spring 122 is firmly secured to the frame 121 and adapted to be extended from its nominal length whenever the flywheel 60 is rotated about its X axis.

The load 15 is rotated by the operator adjusting the potentiometer tap 82a to rotate the motor 50 in a desired direction while the clutch 20 is engaged. This rotational moment is coupled by the clutch 20 and linkages 115 and 116 to the gimbal shaft 25. This torque applied about the vertical (Z) axis of the flywheel 60 causes a rotation of the flywheel 60 about an axis displaced 90 degrees from the Z axis and from the flywheel spin (Y) axis. The flywheel 60 therefore tilts about the horizontal X axis acting against the spring(s) 122, this being the same sequence of events as transpired for operation of the FIG. 1 embodiment.

The above sequence of operation is characterized by a large reaction torque, i.e., a resistance to angular motion of the gimbal 30 about the vertical Z axis. Thus, the actuated linkage 105–115–20–116 coupling the gimbal 30 with the motor 50 rotates the freely swiveled movable platform 10 and load 15 rather than the relatively stiff and rigid shaft 25. Accordingly, the desired motion is imparted to the load. In correspondence with the operation of the FIG. 1 arrangement, the load is stopped at the desired position by a counter-rotation of the motor 50, and successive torque impulses, with the clutch 20 periodically disengaged, may be applied to drive heavy loads. For this repetitive pulsing operation of the FIG. 4 arrangement, the flywheel 60 is cyclically reset by the action of the extended spring(s) 122 when the motor 50 is de-energized. Thus, the arrangement of FIG. 4 also serves to orient the load 15.

It is to be understood that the above-described arrangements are only illustrative of the principles of the present invention. Numerous modifications and adaptations thereof may be devised by those skilled in the art without departing from the spirit and scope of the present invention.

What is claimed is:

1. In combination in apparatus for conveying a supported load, a platform for supporting the load, said platform being horizontally disposed, a flywheel having a spin axis, gimbal means for mounting said flywheel for rotation about a horizontal axis for said flywheel, means for spinning said flywheel about its spin axis, means for securing said gimbal to said platform, means for selectively rotating said flywheel about said horizontal axis, wherein said gimbal means includes frame means connected to said platform, a flywheel securing mounting bracket, rotary means connecting said mounting bracket to said frame means, means for attaching said flywheel spinning means to said mounting bracket, means for attaching said flywheel rotating means to said frame means, means for limiting the angle of rotation of said flywheel about said horizontal axis, wherein said angle limiting means comprises limiting means attached to said flywheel mounting bracket and adapted for rotation about said horizontal axis, a slot in said limiting means, means for sliding through said slot, and spring means connecting said sliding means and said gimbal frame means.

2. Apparatus for orienting a load comprising a load supporting frame, a gimbal rotatably attached to said frame, a flywheel having a spin axis normal to the flywheel and a horizontal axis substantially normal to said spin axis, means for securing said flywheel to said gimbal for rotation about said horizontal axis, means for rotating said flywheel about said spin axis, and means for applying a motor driving rotational torque between said frame and said gimbal, wherein said rotational torque applying means comprises a motor attached to said platform, and means for coupling said motor and said gimbal.

3. A combination as in claim 2 wherein said coupling means includes clutch means for selectively engaging said motor and said gimbal.

References Cited

UNITED STATES PATENTS

| | | | |
|---|---|---|---|
| 2,926,530 | 3/1960 | Mueller et al. | 74—5X |
| 2,961,877 | 11/1960 | Edwards, Jr. | 74—5.22 |
| 3,004,437 | 10/1961 | Pittman | 74—5.22X |
| 3,141,339 | 7/1964 | Koril | 74—5.22X |
| 3,203,644 | 8/1965 | Kellogg, Jr. | 74—5.22X |
| 3,210,114 | 10/1965 | Lawton | 294—88X |
| 3,393,555 | 7/1968 | Flannelly | 74—5.22X |

MANUEL A. ANTONAKAS, Primary Examiner

U.S. Cl. X.R.

294—81